United States Patent [19]
Whittington et al.

[11] 3,843,306
[45] Oct. 22, 1974

[54] OIL ABSORBENT FOAMED SILICATE FOR OIL POLLUTION CONTROL

[75] Inventors: J. Mark C. Whittington, Hedgesville, W. Va.; John E. Meyer; Glenn D. Tingle, both of Hagerstown, Md.

[73] Assignee: GAF Corporation, New York, N.Y.

[22] Filed: Dec. 22, 1972

[21] Appl. No.: 317,621

Related U.S. Application Data

[62] Division of Ser. No. 114,076, Feb. 9, 1971, Pat. No. 3,728,208.

[52] U.S. Cl............................ 431/8, 210/36, 210/40, 210/DIG. 21
[51] Int. Cl............................................. E02b 15/04
[58] Field of Search................ 210/36, 40, DIG. 21; 431/2, 8

[56] References Cited
UNITED STATES PATENTS

| | | | |
|---|---|---|---|
| 3,589,844 | 6/1971 | Kraemer et al. | 210/40 X |
| 3,696,051 | 10/1972 | McGuire et al. | 210/36 |

*Primary Examiner*—Samih N. Zaharna
*Assistant Examiner*—Ivars Cintins
*Attorney, Agent, or Firm*—Walter C. Kehm; Samson B. Leavitt

[57] ABSTRACT

A porous alkali metal silicate foam having oleophilic-hydrophobic properties is provided for use in oil spill control and removal. The silicate foam is preferably formed from a blend comprising solid and liquid alkali metal silicates and an oil absorption-water repellent agent. The blend is pelletized, heated in an oven to expand the material into foam particles, and then shredded, graded and re-treated with an oleophilic-hydrophobic agent to coat the internal and external surfaces and thereby further enhance the oil-absorption characteristics.

The foam particles float on water and can absorb about 3 times their own weight in oil without being wetted by the water. When spread over approximately 75% of an oil slick area, the oil is immediately wicked into the foam and can be ignited. Burning continues until the oil is completely consumed. The silicate foam is incombustible and can be reused. The foam also permits recovery of the oil, rather than burning. The oil soaked particles can be skimmed from the surface and the oil extracted by the use of solvents.

9 Claims, No Drawings

OIL ABSORBENT FOAMED SILICATE FOR OIL POLLUTION CONTROL

This is a division of application Ser. No. 114,076, filed Feb. 9, 1971, now U.S. Pat. No. 3,728,208.

The problem of oil spills and the resulting pollution of bodies of water and adjacent shore areas is of ever increasing concern. The ultimate solution to this problem, of course, rests in the development of a means to prevent spills before the fact, rather than cleaning them up after the fact. But for the present, an efficient and inexpensive means for removing large quantities of oil from the surface of water is required, and it is the purpose of the invention disclosed herein to provide a new oil absorption material which greatly facilitates such removal.

In oil spill control and clean-up two problems are present. The first concerns dispersement of the oil from the spill site, and the second concerns the disposal or recover of the oil once its dispersement is controlled. Presently, one of the most effective products for controlling dispersement of oil on water is straw. The straw which is spread over the entire oil slick area, is naturally oleophilic and acts as an oil absorbent. Once saturated, the straw prevents further dispersement of the oil on the water. Large booms are then employed to gather and recover the oil saturated straw. It should be noted, however, that the oil capacity of the straw is often less than the quantity of oil on the surface of the water, so that more than one application of straw to the oil spill area is required to contain and control all of the oil. Once recovered by the boom the straw can be passed through large presses to remove and recover the oil, placed in large containers for disposal, or simply carried to a dump site and discarded. In the first two cases the equipment required to recover or dispose of the oil is quite expensive and rather inefficient. In the third case the pollution is merely relocated, not eliminated.

It is often desirable to dispose of spilled oil directly on the water surface by burning. This would seem to be the most expeditious means of disposal in many instances, but unfortunately it is not possible to ignite saturated straw while it remains on the water. Although the straw is quite absorbent, it does not serve as a wick to permit proper oil ignition and burning particularly in the case of crude oil.

Plastic foam materials, such as urea formaldehyde, have also been used as absorbents to soak up spilled oil. These materials possess essentially the same characteristics as the straw, in that they prevent further oil dispersement after saturation, but must be scooped up to remove the oil from the surface of the water. Although oil soaked plastic foams are often ignitible, they are also not suitable wicking materials because they are destroyed by excessive heat.

The nonburnability of oil on the water surface greatly limits the use of straw and plastic foam, particularly in the control of oil spills on the open seas where burning, if possible, would be the most effective means of oil disposal. Recognizing the advantages of burning, attempts have been made to provide oil absorbent materials which serve as satisfactory wicks to permit ignition. The difficulty in igniting the oil is caused by the fact that most oil spills involve crude oil, which has a very low volatility and a relatively high ignition temperature. As a result, the cooling effect of the water beneath the oil is usually sufficient to prevent ignition. The problem then is one of raising the oil sufficiently above the surface so that the cooling effect of the water is minimized.

A product presently available for this purpose is known as "Seabeads" and is produced by the Pittsburgh-Corning Corporation. "Seabeads" are small cellulated glass beads of borosilicate, which are spherical in shape and range in size from about one-eighth to one-fourth of an inch in diameter. The beads float on the surface in contiguous juxtaposition to one another, and through capillary action become coated with oil. The coated beads can be ignited and capillary action continues as the oil burns. Unfortunately, "Seabeads" are quite expensive, and must cover 100 percent of the oil slick area in order to completely burn up all of the oil from the surface. In addition, since the oil merely coats the surface of the beads rather than permeating the interior portions, and the beads float independently of each other, their effectiveness is greatly reduced in rough seas.

Another oil absorption product which is available to permit ignition of oil on water is known as "Cab-O-Sil", produced by the Cabot Corporation. This material is silane treated silica in the form of a powder, which also becomes coated with oil and serves as a wick to permit ignition. Unfortunately, "Cab-O-Sil" is more than twice as expensive as "Seabeads," and is even more susceptible to inefficient operation in rough seas due to their very small particle size.

In accordance with the present invention a new more efficient, less expensive oil absorbent composition is provided to greatly facilitate oil spill control and removal. The new composition serves as a wick to permit ignition of spilled oil on the water surface, or may be gathered from the surface to permit oil recover.

In general, the oil absorbent material of the invention is in pellet form and comprises porous expanded alkali metal silicate particles of generally irregular shape ranging in size from about 0.02 to about 0.50 inches or larger and an oleophilic-hydrophobic coating on the internal and external surfaces of said particles. The foam pellets can be formed from a blend of powered alkali metal silicate and water, or a blend of solid powder and liquid alkali metal silicates which is expanded into a foam by firing, and then crushed and strained to the desired size. The blend also contains, and the particles are preferably impregnated after expansion and crushing with an oleophilic-hydrophobic agent to impart oil absorption-water repellent properties to the silicate foam.

The expanded porous silicate particles float on water and absorb crude or other grades of oil from the surface without being wetted by the water. Although crude oil is not ignitable on the water surface, absorption into the inorganic foam of the invention raises the fuel a sufficient distance from the water to facilitate complete combustion until all petroleum residue is consumed.

There are many advantages to the use of the foamed silicate of the invention as an oil absorption wicking agent as opposed to the previously available products. For example, the cost of the foamed silicate is approximately one-tenth of the cost of the products discussed above. In addition, the effective use of silicate foam does not require that the particles be spread over 100 percent of the oil slick area. It has been found that merely covering as little as about 75 percent of the oil surface area is sufficient to permit substantially complete absorption and ignition of all of the oil from the water surface. As the oil burns, the absorptive wicking action of the foam continues until all the oil has been consumed. This action is enhanced by the fact that the foam silicate particles internally absorb the oil rather than merely becoming oil coated, and as a result are capable of absorbing approximately one to three times their own weight in oil, depending on such factors as sea conditions, temperature of the water, and the viscosity of the oil. After burning is complete, the silicate foam can be collected and reused or merely left to break up from abrasion in the water. The material is sufficiently inert and nontoxic so that marine ecology and the shore line are left relatively undisturbed. Another advantage of the silicate of the invention is that the ingredients for preparation of the foam are safe, stable and noncombustible, and can be transported to the site of the spill where with portable firing equipment the foam can be generated.

Either sodium or potassium silicate can be employed. However, sodium silicate is preferred because of its low cost and availability in many forms, which permit a suitable blend of materials to produce the desired physical properties in the expanded foam. Preferably, a blend of two grades of sodium silicate is employed: one being substantially dehydrated in the form of a solid powder; and the other being a liquid solution of sodium silicate and water. The amount of water in the formulation controls the cell structure and the size of the expanded foam. A lower water content results in superior cell structure and a finer pore size. Preferably the composition before expansion has a total water content of about 30 percent to 50 percent by weight. The mixture of solid and liquid sodium silicate permits adjustment of the water content within this percentage range to achieve a foam product with the desired pore size, which is preferably in the range of about 2 to 20 microns, although pore sizes up to 1000 microns are effective. A weight ratio of solid to liquid sodium silicate in the approximate range of 0.4:1 to 2.5:1 produces foam particles having the appropriate pore sizes. Generally, most grades of available powdered sodium silicate have a water content of less than 20 percent by weight, and liquid sodium silicate grades have a water content of about 55 percent to 65 percent. Accordingly, equal quantities of solid and liquid sodium silicate yield blends with the proper water content and form satisfactory foams. Of course, the adjustment of water content can be made simply by blending powdered silicate and water, but this is less desirable from manufacturing standpoint, since control is more difficult.

Sodium silicate comprises $Na_2O$ and $SiO_2$, and is available with varying percentages of these ingredients. However, the relative amounts of one to the other are usually not critical, so that both the liquid and solid grades of sodium silicate can have a ratio of $Na_2O$ to $SiO_2$ in the broad range of about 1:1.6 to 1:4.0.

An optional mineral extender such as clay, talc, magnesium silicate, diatomaceous earth or the like can be included in the silicate blend. The addition of such material strengthens and tends to insolubilize the resultant silicate foam structure and improves its friability and abrasion resistance. However, the foam density increases and its porosity decreases as the amount of mineral extender is increased. An increase in density and a decrease in porosity of course reduces the absorption characteristics of the foam. Therefore, the amount of such extenders must be limited. Generally it is not recommended to use more than about 25 percent by weight mineral extender.

The oleophilic-hydrophobic agent in the silicate blend has a dual function. Firstly, it imparts oil absorption and water repellent properties to the resultant foam, which makes it preferentially absorb organic hydrocarbons and similar materials, such as crude oil while repelling and not absorbing water. By blending the oil absorption agent with the alkali metal silicate, it becomes an integral part of the resulting foam structure, uniformly distributed throughout, and thereby gives the internal as well as the exterior surfaces a high affinity for oil. Secondly, the oil absorption agent is often necessary for proper cell formation of the foam. Alkali metal silicates have the tendency upon firing to expand into large, puffed, hollow spheres. The oil absorption agent in the formulation of the invention can be chosen to function as a stabilizer to produce upon expansion a cellular structure of reasonably uniform pore size.

There are many different types of known oleophilic-hydrophobic agents which can be employed in the silicate blend. These include metal and alkaline earth metal salts of high molelcular weight fatty acids (e.g., monocarboxylic acid of about 14 to 22 carbon atoms), such as aluminum stearate, zinc stearate and the like; and reactive silicone monomers, such as sodium methyl siliconate, methyltrimethoxysilane, methyltriethoxysilane and the like. These materials can be added to the blend in solution form having concentrations ranging from 10 percent to 100 percent by weight in well known solvents. The reactive silicone monomers are polymerized to become water repellent and oil absorbent by the application of heat during the expanding operation in the case of sodium methyl siliconate, and by the water which serves as a catalyst in the case of the silanes mentioned.

Additional oleophilic-hydrophobic agents will be known to those skilled in the art. In general, however, the non-wettability and oil affinity characteristics of the foam derived from silicones, as well as their ability to stabilize the foam structure, render them the preferred material.

The following typical formulation range by weight has been found to be quite satisfactory:

4–10 parts sodium silicate dehydrated (powder form)

4–10 parts sodium silicate liquid

0–5 parts mineral extender 0.2–1 parts oleophilic-hydrophobic agent

The composition is produced by mixing and thoroughly blending the sodium silicate, oleophilic-hydrophobic agent and mineral filler extender to form a smooth, dough-like mass; extruding or pelletizing the mass using well known means to a suitable size in the range of approximately one-sixteenth to one-fourth inch in diameter; and then passing the semi-solid pellets through a heating chamber, such as a rotary kiln or a microwave oven where at elevated temperatures in the range of about 250° to 1,000°F the pellets will expand into random shaped foam particles. During the heating process the volume of the silicate pellets increases three to four times. The resulting foam has a bulk density in the range from about 6 to about 12 lb./ft.³ The expanded silicate can then be crushed into smaller randomly shaped particles to facilitate spreading over the oil spill area. Foam particles crushed and strained to about 0.02 to 0.50 inches and larger in size are suitable. The crushing also exposes the interior cellular portions of the foamed silicate, thereby increasing the surface area to contact the oil. The strained particles smaller than about 0.02 inches can be recycled in a new blend to form further foam, so that there is little waste of material. This is particularly important where the expanding process is carried out aboard ship.

As an alternative method the blended dough-like mass can be heated directly without prior pelletizing. This results in an expanded foam slab which can also be used as an oil wick on water. However, from an absorption efficiency viewpoint it is preferable to shred the foam slab using available shredding devices and strain the particles to the sizes given above, to increase the surface area in contact with the oil.

It is often desirable to increase the insolubility of the foam particles, particularly where a mineral extender is not employed in the formulation. A spray application of 15 to 25 pounds of 17 percent hydrochloric acid per ton of foam pellets as they emerge from the heat expanding treatment will accomplish this. Residual heat retained by the particles will flash off excess acid and water resulting in dry and non-acidic pellets.

In addition to the oleophilic-hydrophobic agent used in the original formulation, it is usually desirable to treat the foam particles after expansion by impregnation to coat their external and internal surfaces with a material adapted to further increase the organophilic characteristics, and render the material more water repellent. Many types of oleophilic-hydrophobic agents including high molecular weight fatty acids, e.g., monocarboxylic acid of about 14 to 20 atoms, and reactive silicone monomers as mentioned above are available, which can be administered simply by spraying, submerging or otherwise impregnating the foam particles. The following are merely representative:

Stearic acid is a desirable organic acid which increases the oleophilic-hydrophobic characteristics of the silicate foam when comprising about 2.0 to 140.0 pounds per ton of dry foam (1.0 percent to 7.0 percent o.w.f. [on the weight of the foam]). The stearic acid is first dissolved in trichloroethane or another suitable organic solvent to the required impregnating concentration, e.g., about 10 percent to 20 percent by weight.

According to another preferred embodiment the silicate foam is impregnated with about 1 percent to 30 percent o.w.f. of a reactive silicone, which coats and/or reacts with the foam surfaces. A suitable silicone monomer with which the foam silicate material may be coated (e.g., by spraying or submerging) is 60.0 to 600.0 pounds of methyltriethoxysilane or methyltrimethoxysilane per ton of fibrous material (3 percent to 30 percent o.w.f.). The silane which requires moisture (e.g., 60 percent to 80 percent relative humidity air) to become effective can be dissolved to the desired concentration of about 10 percent to 100 percent by weight in methanol, ethanol, trichloroethane or other suitable solvents prior to its application to the foamed silicate. A 10 percent to 100 percent by weight solution containing two-thirds monomer and one-third polymer by weight of methyltriethoxysilane in the same solvent and comprising about 60 to 600 pounds per ton of foam is also an effective treating agent when made reactive in situ with moisture. Another reactive silicone monomer which has been found to be suitable in increasing water resistance and oil affinity of the foam is methyltrichlorosilane employed in proportions of about 1 percent to 10 percent o.w.f. (20.0 to 200.0 pounds per ton of foam). This monomer may be applied in its 100 percent concentrated form or in solution in toluene, benzene, ethyl acetate, or other suitable solvents at the required concentration (e.g., about 10 percent to 30 percent).

The hydrophobic characteristics of the foam may also be improved with the impregnation of a 20 percent to 40 percent by weight solution of sodium methyl siliconate in water in sufficient quantity so that the siliconate will comprise after drying about 10.0 to 40.0 pounds per ton of foam material (0.5 percent to 2 percent o.w.f.). This reactive silicone monomer must be polymerized in situ before becoming water resistant. This can be accomplished by heating to about 120°F for 1 to 2 hours. If the silicone is applied soon after the expansion of the foam the residual heat retained thereby is often sufficient to affectuate polymerization.

It is sometimes necessary to increase the concentrations of the oleophilic-hydrophobic treatment when spray procedures are used. Spraying does not always effectuate full penetration of the foam as readily as immersion or soaking, and is therefore less desirable.

Other hydrophobic treating agents which can be applied to the foam to enhance their oil absorbent properties will be known to those skilled in the art.

It has been found that the post-expansion treatment steps can be eliminated if higher concentrations of silicone or other treating agents are employed in the original formulation. But from an economic standpoint it appears to be advantageous to employ less silicone initially, and to employ the post treatment step. However, as discussed above it is important that the initial formulation include silicone or a like substance to insure that the oil absorption properties of the foam are uniformly distributed throughout each particle, and to stabilize the cell formation. The temperature to which the pellets are fired will have some influence on the characteristics imparted by the silicone in the original formulation and must be taken into consideration. Very high temperatures (i.e., above 500°F) tend to reduce the water repellency, but at the same time the silicate structure is more insolubilized. In such cases post expansion treatment is essential.

The following examples are included for illustrative purposes and are in no way intended to limit the scope of the instant invention. All parts and proportions referred to herein and in the appended claims are by weight unless otherwise indicated.

Example 1

5 parts sodium silicate in dehydrated powder form having an 18 percent water content obtained from the Philadelphia Quartz Company and designated Silicate G was mixed with 4 parts liquid sodium silicate having a 62 percent water content obtained from the Philadelphia Quartz Company and designated Silicate N. Both Silicate G and Silicate N have a 1:3.22 ratio of $Na_2O$ to $SiO_2$. 0.2 parts of a 30 percent sodium methyl siliconate solution in water obtained from the General Electric Company and designated SC-3000 was blended with the silicate mixture to form a dough-like mass having a 40 percent water content. This mass was formed into pellets approximately 0.125 inch in diameter, and then heated in a rotary kiln where they expanded to approximately four times their original size. The mass exit temperature was about 250°F. The expanded foam silicate pellets were then crushed into irregular shaped particles and strained so that 50 percent were plus 10 mesh (50 percent of the particles were above 0.065 inches in diameter ranging as high as about one-half inch), and 50 percent minus 10 mesh, plus 28 mesh (50 percent of the particles were between 0.065 inches and 0.0237 inches in diameter). The sized particles were then spray treated with a sufficient amount of a 30 percent sodium methyl siliconate solution in water, so as to deposit after drying 20 pounds of the siliconate per ton of foam. The residual heat in the foam particles was sufficient to polymerize the siliconate. The foam density after the silicone treatment was approximately 7 pounds per cubic foot.

Example 2

Foamed silicate particles produced in accordance with Example 1 were spread on a crude oil slick covering about 75 percent of the oil area. The amount of particles employed was approximately 1 pound per gallon of oil or 7 pounds per hundred square feet. The crude oil immediately wicked into the foam and was thereafter ignited. As the oil was consumed, the incombustible foam material continued to absorb the oil until there was no longer any more available on the water. The foamed silicate particles were then skimmed from the surface and found to be suitable for reuse, as shown in the following example.

Example 3

One pound of the foam particles used in Example 2 were uniformly spread over an oil slick known to contain 0.4 gallons of crude oil (about 3 lbs.) and covering an area of approximately 40 ft.$^2$ The oil was immediately absorbed by the foam. After absorption of the oil, the saturated foamed particles were skimmed from the surface. No oil remained on the water surface, indicating that the reused foam silicate particles had an oil absorption capacity of at least 3 times their own weight.

Example 4

5 parts sodium silicate in dehydrated powder form (Silicate G) was mixed with 5 parts liquid sodium silicate (Silicate N). To this mixture 3 parts of Kaolin clay was added. Kaolin clay is primarily $SiO_2$ and $Al_2O_3$ and is obtained from the United Sierra Company in a product designated "Mercer Clay." 0.2 parts sodium methyl siliconate (General Electric SC-3000) was blended with the silicate/clay mixture to form a dough-like mass. This mass was then expanded to three to four times its original size by heating in a microwave oven. The expanded silicate foam having an amorphous shape was shredded and strained so that 50 percent was plus 10 mesh and 50 percent minus 10 mesh. The largest particles were about one-half inch in size. The foam density was approximately 12 lbs./ft.$^3$

Example 5

The foam silicate particles of Example 4 were tested in the same manner as in Example 2. The results were the same with the exception that complete consumption of the oil required a longer time period.

Example 6

Example 3 was repeated using the foam particles of Example 4. The oil absorption capacity of the particles was found to be about 1½ times its own weight, indicating that the addition of clay and the lack of a post treatment have adverse effects.

Example 7

5 parts sodium silicate powder (Silicate G) was mixed with 4 parts liquid sodium silicate (Silicate N). 0.2 parts sodium methyl siliconate (General Electric Company SC-3000) was blended with the mixture to form a dough-like mass. The mass was heated in a rotary kiln where it expanded to about 4 times the original size. The oven exit temperature was about 250°F. The product was then fed into a shredder and reduced in size and strained so that 50 percent was plus 10 mesh and 50 percent minus 10 mesh, and the largest particle was about one-half inch in size. The foam density was approximately 7 lbs./ft.$^3$ The foam was then impregnated by spraying with 100 percent methyltrichlorosilane as supplied by General Electric Company under the designation SC-3003, so as to deposit 20 pounds (1 percent o.w.f.) per ton of foam after drying. The treated particles were tested in the same manner as the particles of Example 1 and were found to possess substantially the same characteristics.

Example 8

5 parts sodium silicate powder (Silicate G) was mixed with 3 parts liquid sodium silicate (Silicate N) and 3 parts liquid sodium silicate designated Silicate D having a 56 percent water content. Both liquid silicates were obtained from Philadelphia Quartz Company. The Silicate N has a 1:3.22 $Na_2O$ to $SiO_2$ ratio and the Silicate D a 1:2.0 ratio. The ingredients were blended thoroughly to a dough-like consistency, pelletized and expanded by heating to about 300°F in an oven. The expanded foam which was 4 times its original size was then shredded and strained so that 50 percent was plus 10 mesh and 50 percent was minus 10 mesh. The sized particles were then impregnated with a 17 percent solution of HCl at a 20 lbs./ton of foam rate to insolubilize them, and a 40 percent solution of sodium methyl siliconate in water to render them oil absorbent and water repellent. 30 pounds of siliconate was deposited after drying on each ton of foam. The residual heat from the expanded foam was sufficient to flash off the HCl and polymerize the silicone. The foam density after treatment was about 8 lbs./ft.$^3$ The particles were tested in accordance with Example 3 and found to have an oil absorption capacity of about two times their own weight. The reduction in oil capacity compared to the particles of Example 1 was attributable to the lack of silicone in the formulation.

Example 9

5 parts by weight sodium silicate powder (Silicate G) was mixed with 5 parts liquid sodium silicate (Silicate N). The ingredients are thoroughly blended to a dough-like mass and formed into pellets one-eighth inch in diameter. The pellets were then heated in a rotary kiln where they expanded to four times their original size. The mass exit temperature was 250°F. The particles were then treated with a 17 percent solution of HCl applied at a rate of 20 lbs./ton of foam. The dried particles were then crushed and strained so that 50 percent are plus 10 mesh and 50 percent are minus 10 mesh. The graded material was then further treated with a 10 percent solution of stearic acid dissolved in trichloroethane in sufficient quantity to deposit, after drying, 25 pounds of stearic acid per ton of foam. The foam density of the finished product was approximately 7 lbs./ft.³ These particles were also found to have an oil absorption capacity of about 2 times their own weight.

The invention has been disclosed with respect to certain preferred embodiments and various modifications and variations thereof will be obvious to those skilled in the art. It is to be understood that such modifications and variations are to be included within the spirit and scope of this invention.

What we claim is:

1. An improved process for controlling and removing oil present on the surface of water comprising depositing foamed silicate particles on the surface of the water having an oil slick thereon, said foamed silicate particles comprising a porous alkali metal silicate material having a bulk density in the range of from about 6 to about 12 pounds per cubic foot and having an oleophilic-hydrophobic agent distributed uniformly throughout as an integral part of said foamed silicate particles, whereby said foamed silicate particles have an enhanced affinity for oil throughout the entire particle composition, facilitating the controlling of the oil on the surface of said water through absorption by said foamed silicate particles.

2. The process of claim 1 and including the igniting of said oil absorbed by said foamed silicate particles to burn said oil absorbed from the surface of the water, said particles serving as a wick drawing oil therein off the surface of the water for burning, said burning facilitating the drawing of additional quantities of oil from the surface of the water upon which said foamed silicate particles are deposited.

3. The process of claim 1 in which said foamed silicate particles are deposited over an area comprising at least about 75 percent of the area of said water having an oil slick thereon.

4. The process of claim 1 in which the oleophilic-hydrophobic agent distributed throughout the foamed silicate particles is selected from the group consisting of metal and alkali earth metal salts of a high molecular weight fatty acid and reactive silicone monomers.

5. The process of claim 4 in which said foamed silicate particles comprise small, random-shaped particles, the major dimension of which is in the range of from about 0.02 to about 0.50 inches.

6. The process of claim 4 in which said oleophilic-hydrophobic agent comprises a silicone monomer selected from the group consisting of sodium methyl siliconate, methyltrimethoxy-silane and methyltriethoxysilane.

7. The process of claim 4 in which said agent comprises aluminum stearate.

8. The process of claim 4 in which said agent comprises zinc stearate.

9. The process of claim 4 in which said foamed silicate particles deposited on the surface of the water are impregnated with an oleophilic-hydrophobic coating to further assure the oil absorption-water repellency characteristics of said foamed silicate particles.

* * * * *